United States Patent Office 3,248,994
Patented May 3, 1966

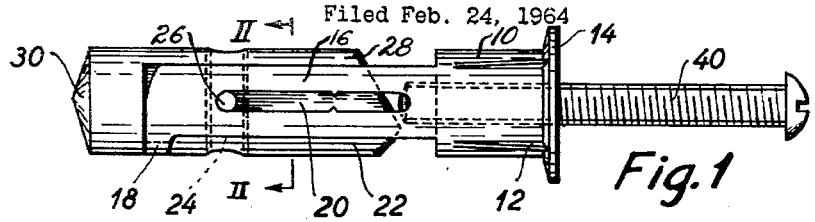
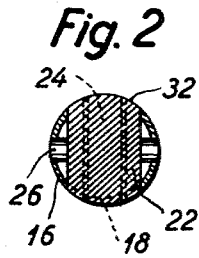
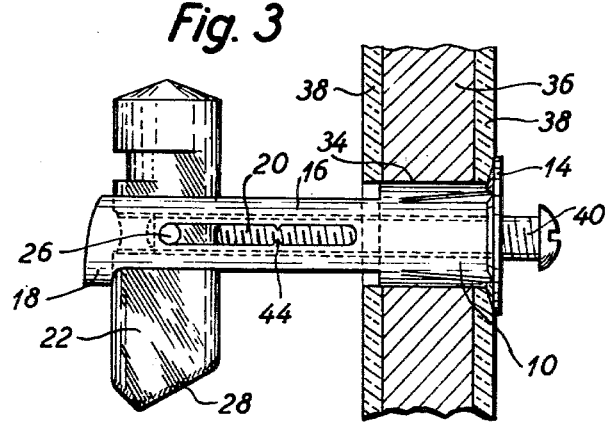
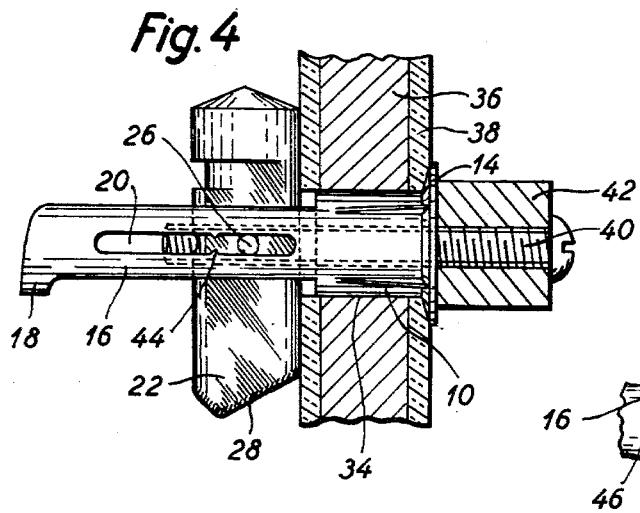
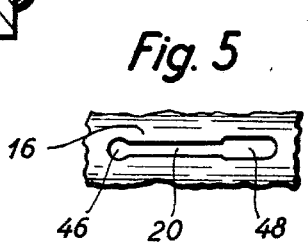

3,248,994
FASTENING DEVICE
Louis Aackersberg Mortensen, 35 Konevejen,
Birkerod, Denmark
Filed Feb. 24, 1964, Ser. No. 346,751
Claims priority, application Denmark, Feb. 26, 1963,
868/63
6 Claims. (Cl. 85—3)

This invention relates to a fastening device intended for use in cases where, by means of a screw, an object is to be fastened to a relatively thin plate or wall, the rear of which is inaccessible. The invention is particularly useful in connection with light partitions comprising two plates which are held mutually spaced by means of a framework.

The present fastening device is of the type consisting of a nipple having at one end a flange and at the other end two projecting parallel fingers, between which an oblong body is arranged having a transverse threaded bore and able to rotate around an axis being perpendicular to the axis of the nipple, and being defined by pins slidably mounted in slots in the parallel fingers to enable the oblong body, when having been tilted 90° by a pressure against an inclined surface at one end thereof by means of a screw passing through the nipple, to be drawn towards the nipple by screwing the screw into said threaded bore, whereby said body will abut the rear of the plate in which the nipple is to be mounted and fastened.

According to the invention the oblong body is fixed in the said abutting position so as to resist backward movement.

This involves the advantage that after fixing of the oblong body the screw may be unscrewed, the object to be fastened on the wall may be arranged under the head of the screw, and the screw screwed in again without the oblong body being moved backwards. In many cases the screw is replaced by a shorter screw according to the thickness of the object to be fastened. This is possible because the oblong body is fixed in a position in the vicinity of the rear of the wall plate.

The fixing of the oblong body may according to the invention be obtained by different means. On the parallel fingers there may be abutments projecting into the slots in the vicinity of the inmost end thereof, or the slots may be so narrow that a displacement of the pins takes place frictionally. In the last-mentioned case it may be appropriate for the slots to be enlarged at both ends so that the oblong body is here freely rotatable and therefore easily adaptable to the screw.

Another object of the invention is to provide an appropriate shape of a fastening device of the type mentioned above so that said device may easily be led into a hole drilled in the plate in advance. In this embodiment the parallel fingers are at their extreme end united by an arcuate bridge, and the oblong body is so shaped that when lying in the direction of the axis of the nipple its surface together with the surface of the fingers and that of the bridge forms an almost unbroken cylindrical surface.

An embodiment of the invention will now be particularly described with reference to the accompanying drawing, on which—

FIG. 1 shows a side view of the fastening device in its starting position,

FIG. 2 a cross-section taken along the line II—II in FIG. 1,

FIG. 3 a side view of the fastening device arranged in a hole in a wall after its oblong body has been tilted 90° and is ready for being led towards the rear of the wall, FIG. 4 the same view as FIG. 3 after the oblong body has been led towards the rear of the wall, and the object to be fastened has been fixed to the wall, and FIG. 5 another embodiment of the slots of the fastening device.

The fastening device comprises a cylindrical nipple 10 having a peripheral surface provided with a number of tapered ribs 12 and having at one end a flange 14. At its other end the nipple is provided with two projecting, parallel fingers 16 which in cross-section are curved according to a cylindrical surface, the outside of which has the same diameter as the external surface of the nipple, vide FIG. 2. At their free ends these fingers are connected by means of an arcuate bridge 18 lying at one side thereof and also on the said cylindrical surface. At the center each finger 16 is provided with a longitudinal slot 20.

Between the fingers 16 an oblong body or toggle element 22 is arranged, said body having approximately at its center a transverse threaded hole or bore 24. On a level with said hole and perpendicularly to its axis, pins 26 are arranged on each side of the body 22, said pins extending through the slots 20, and having their ends flush with the surface of the fingers 16. At the end which in FIG. 1 turns towards the nipple 10, the body 22 has an inclined surface 28, and at the opposite end 30 it is defined by a low cone. As it appears from FIG. 2 the greater part of this body has such a width that it fits between the fingers 16, and at the top and at the bottom it is defined by cylindrical surfaces 32 which, in connection with the surfaces of the fingers make a cylindrical surface. The portion of the body 22 lying outside the fingers 16 in FIG. 1 is completely rounded off and makes a continuation of the said cylindrical surface.

When the fastening device is to be used, the oblong body 22 is brought into the position shown in FIG. 1, and the whole device is passed through a hole 34 drilled in advance in the wall to which some object is desired to be fastened. The device is preferably intended for use in connection with light walls consisting of a relatively unstable material, e.g. like those consisting of a gypsum plate 36 to the surfaces of which cardboard plates 38 are adhered, vide FIGS. 3 and 4. A screw 40 is used for tilting the body 22 which screw is passed through the opening in the nipple 10 till its end engages the inclined surface 28 on the body, FIG. 1. When the screw 40 is thereafter moved further inwards, the end of the screw will slide along the inclined surface 28 and along the upper surface of the body 22, whereby it is tilted 90° till the threaded bore will register with the screw which may thereafter be screwed into this bore and be connected with the body 22, vide FIG. 3. The screw 40 is now drawn outwards, e.g. by means of a pair of tongs, till the body 22 will abut the rear of the wall.

This position is shown in FIG. 4, where it is also assumed that the screw has been unscrewed and thereafter screwed in again after the object 42 which is to be fastened to the wall has been arranged below the head of the screw.

To prevent the oblong body 22 from being moved backwards when the screw is to be screwed in the second time, there are on the fingers 16 abutments 44 projecting into the slots 20, which abutments 44 are arranged at such a distance from the bottom of the slots turning towards the wall that they permit the oblong body to be moved a short distance backwards from the position shown in FIG. 4. This is necessary if at the drilling of the hole 34 fibers or projecting parts might appear on the inside of the wall.

In the embodiment described it is assumed that the portions of the fastening device apart from the screw consist of plastic material so that the slots 20 may be enlarged resiliently, the pins 26 passing across the abutments 44 during the displacement of the body 22 towards the wall. In spite of the resiliency these abutments resist sufficiently the passage of the pins 26 when the screw 40 is screwed in the second time.

Instead of using the same screw two times a shorter screw might be used for fastening the object 42 according to the thickness of this object in order that the fastening may take place more quickly.

Instead of using the abutments 44 the width of the slots may be so adapted that the displacement of the pins 26 takes place frictionally. If so, it is preferable to provide the slots with enlargements 46 and 48, respectively, at the ends, as shown in FIG. 5. The enlargement 46 is preferably made circular in order that the tilting of the oblong body 22 may easily take place, while the enlargement 48 should, according to what has been stated above, have a certain length in axial direction.

What I claim is:

1. A fastening device comprising a nipple having at one end a flange and at the other end two parallel projecting fingers each having therein a longitudinal slot closed at both ends, an oblong body between said fingers and having at its midsection oppositely projecting trunnions rotatably and slidably received in said slots to retain said oblong body rotatably between said fingers for pivotal movement about an axis perpendicular to the axis of said nipple between a first position in which said oblong body is approximately aligned with said nipple axis and a second position in which said oblong body extends transversely of said nipple axis and projects laterally to both sides of said fingers, and for translatory movement lengthwise of said fingers when said oblong body is in said transverse position, said oblong body having a transverse threaded bore which is aligned with the axis of said nipple when said oblong body is in said transverse position and is engageable by a threaded screw when said oblong body is in said transverse position to draw said oblong body toward said flange to a third position and means for retaining said oblong body in said third position whereby said screw can be removed and another screw can be screwed into said oblong body while said oblong body is held in said third position by said retaining means, said retaining means forming a portion of the walls of the slot and being spaced from the end of the slot which is nearest the flange a distance sufficient to permit limited movement of the body toward the end of the slot remote from the flange.

2. A fastening device according to claim 1, in which said fingers have curved outer surfaces corresponding to a cylindrical surface coaxial with said nipple and are connected at their outer ends by an arcuate bridge and in which said oblong body has opposite curved surfaces corresponding to said cylindrical surface and a cylindrical outer end portion projecting beyond said fingers and forming a continuation of said cylindrical surface, the inner end of said oblong body having a oblique surface and the outer end having a conical surface.

3. A fastening device comprising a nipple having at one end a flange and at the other end two parallel fingers projecting in an axial direction and spaced from one another, each of said fingers having a longitudinal slot closed at both ends and defined by flexible resilient side portions of said respective finger, an oblong body between said fingers and having at its midsection oppositely projecting trunnions rotatably and slidably received in said slots to retain said oblong body rotatably between said fingers for pivotal movement about an axis perpendicular to the axis of said nipple between a first position in which said oblong body is approximately aligned with said nipple axis and a second position in which said oblong body extends transversely of said nipple axis and projects laterally to opposite sides of said fingers, and for translatory movement lengthwise of said fingers when said oblong body is in transverse position, said oblong body having a transverse threaded bore which is aligned with the axis of said nipple when said oblong body is in transverse position and is engageable by a threaded screw when said oblong body is in transverse position to draw said oblong body toward said flange to a third position, each of said slots having a restricted portion having a less transverse dimension than said trunnions, said restricted portions forming portions of the walls of the slot and being spaced from the end of the slot which is nearest the flange a distance sufficient to permit limited movement of the body toward the end of the slot remote from the flange and said restricted portions engaging said trunnions to hold said oblong body in said third position whereby said screw can be removed and another screw can be screwed into said threaded bore while said oblong body is held by said restricted portions in said third position, the resiliency of said side portions of said fingers permitting said side portions to spread to permit passage of said trunnions during movement of said oblong body from said second position to said third position.

4. A fastening device according to claim 3, in which said restricted portions of said slots comprise abutments projecting from said side portions into said slots in position to be engaged by said trunnions when said oblong body is in said third position.

5. A fastening device according to claim 3, in which a first end of said slot remote from said flange is enlarged and a second end of said slot nearest said flange is enlarged, each of said enlarged slot ends have a transverse dimension greater than that of said trunnions and said second enlarged slot end is longer in said axial direction than said first enlarged slot end, said first enlarged slot end receiving said trunnions when said oblong body is in said second position and said first enlarged slot end receiving said trunnions when said oblong body is in said third position.

6. A fastening device according to claim 3, in which said nipple is formed of resilient plastic material.

References Cited by the Examiner

UNITED STATES PATENTS

| 1,650,454 | 11/1927 | Langan | 85—3 |
| 2,609,723 | 9/1952 | Stubbs. | |
| 2,908,196 | 10/1959 | Apfelzweig | 85—3 |

FOREIGN PATENTS 130,259  11/1948  Australia.

EDWARD C. ALLEN, *Primary Examiner.*